US008277862B2

(12) United States Patent
Lee et al.

(10) Patent No.: US 8,277,862 B2
(45) Date of Patent: *Oct. 2, 2012

(54) BEVERAGE PRODUCTS HAVING STEVIOL GLYCOSIDES AND AT LEAST ONE ACID

(75) Inventors: Thomas Lee, Scarsdale, NY (US); Pei K. Chang, Cortlandt Manor, NY (US); Hang Chen, White Plains, NY (US); Todd A. Zaniewski, Sandy Hook, CT (US)

(73) Assignee: Concentrate Manufacturing Company of Ireland, Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 11/962,299

(22) Filed: Dec. 21, 2007

(65) Prior Publication Data

US 2008/0226770 A1  Sep. 18, 2008

Related U.S. Application Data

(63) Continuation-in-part of application No. 11/686,120, filed on Mar. 14, 2007.

(51) Int. Cl.
*A23L 2/00* (2006.01)
(52) U.S. Cl. .................................. 426/590; 426/548
(58) Field of Classification Search .............. 426/548, 426/590
See application file for complete search history.

(56) References Cited

U.S. PATENT DOCUMENTS

| | | | |
|---|---|---|---|
| 3,531,296 A | 9/1970 | Smithies | |
| 4,061,797 A | 12/1977 | Hannan, Jr. et al. | |
| 4,082,858 A | 4/1978 | Morita et al. | |
| 4,133,903 A | 1/1979 | Thiele et al. | |
| 4,361,697 A | 11/1982 | Dobberstein et al. | |
| 4,612,942 A | 9/1986 | Dobberstein et al. | |
| 4,738,856 A | 4/1988 | Clark | |
| 4,830,870 A | 5/1989 | Davis, Jr. et al. | |
| 4,870,059 A | 9/1989 | Mitsuhashi et al. | |
| 4,902,525 A | 2/1990 | Kondou | |
| 4,956,191 A | 9/1990 | Ueda et al. | |
| 4,959,225 A | 9/1990 | Wong et al. | |
| 4,990,354 A | 2/1991 | Bakal et al. | |
| 4,992,279 A | 2/1991 | Palmer et al. | |
| 4,996,196 A | 2/1991 | Mitsuhashi et al. | |
| 5,013,716 A | 5/1991 | Cherukuri et al. | |
| 5,059,428 A | 10/1991 | Wong et al. | |
| 5,059,429 A | 10/1991 | Cherukuri et al. | |
| 5,106,644 A | 4/1992 | El-Nokaly | |
| 5,219,842 A | 6/1993 | Okada et al. | |
| 5,411,755 A | 5/1995 | Downton et al. | |
| 5,411,775 A | 5/1995 | Wilson | |
| 5,417,994 A | 5/1995 | Chang et al. | |
| 5,433,965 A | 7/1995 | Fischer et al. | |
| 5,437,880 A | 8/1995 | Takaichi et al. | |
| 5,464,619 A | 11/1995 | Kuznicki et al. | |
| 5,480,667 A | 1/1996 | Corrigan et al. | |
| 5,631,038 A | 5/1997 | Kurtz et al. | |
| 5,637,618 A | 6/1997 | Kurtz et al. | |
| 5,643,956 A | 7/1997 | Kurtz et al. | |
| 5,646,122 A | 7/1997 | Kurtz et al. | |
| 5,650,403 A | 7/1997 | Kurtz et al. | |
| 5,654,311 A | 8/1997 | Kurtz et al. | |
| 5,665,755 A | 9/1997 | Kurtz et al. | |
| 5,681,569 A | 10/1997 | Kuznicki et al. | |
| 5,700,792 A | 12/1997 | Kurtz et al. | |
| 5,703,053 A | 12/1997 | Kurtz et al. | |
| 5,780,086 A | 7/1998 | Kirksey et al. | |
| PP10,564 P | 8/1998 | Marsolais et al. | |
| 5,827,560 A | 10/1998 | Fu et al. | |
| 5,830,523 A | 11/1998 | Takaicki et al. | |
| 5,866,608 A | 2/1999 | Kurtz et al. | |
| 5,895,672 A | 4/1999 | Cooper | |
| 5,916,881 A | 6/1999 | Okada et al. | |
| 6,007,856 A | 12/1999 | Cox et al. | |
| 6,008,250 A | 12/1999 | Kurtz et al. | |
| 6,010,734 A | 1/2000 | Whelan et al. | |
| 6,015,792 A | 1/2000 | Kurtz et al. | |
| 6,054,168 A | 4/2000 | Lioutas et al. | |
| 6,083,549 A | 7/2000 | Harada et al. | |
| 6,132,787 A | 10/2000 | Bunger et al. | |
| 6,136,356 A | 10/2000 | Bunger et al. | |
| 6,180,155 B1 | 1/2001 | Lotz et al. | |
| 6,255,557 B1 | 7/2001 | Brandle | |

(Continued)

FOREIGN PATENT DOCUMENTS

CA  2198554  10/2006

(Continued)

OTHER PUBLICATIONS

Marsh, Ken, et al. "Perception of flavor in standarized fruit pulps with additions of acids or sugars." Food Quality and Perceptions, 17 (2006) 376-386. Available online Jun. 16, 2005.*
European Commission Scientific Committee of Food (Jun. 1999). Opinion on Stevioside as a Sweetener http://www.food.gov.uk/multimedia/pdfs/stevioside.pdf.
http://www.inchem.org/documents/jecfa/jecmono/v042je07.htm—International Programme on Chemical Safety World Health Organization, Safety Evaluation of Certain Food Additives, Who Food Additives Series: 42, Prepared by the Fifty-first meeting of the Joint FAO/WHO Expert Committee on Food Additives (JECFA), World Health Organization, Geneva, 1999, IPCS—International Programme on Chemical Safety, Stevioside, First draft prepared by Dr. Josef Schlatter, Swiss Federal Office of Public Health, Switzerland.
International Search Report corresponding to PCT/US2008/056790.
Office Action relating to corresponding EP Application No. 08743825.5.
Russian Patent Application No. 2008151079, Official Notification on results of patentability examination, report dated Jun. 18, 2010.

(Continued)

*Primary Examiner* — D. Lawrence Tarazano
*Assistant Examiner* — Jenna A. Watts
(74) *Attorney, Agent, or Firm* — Banner & Witcoff, Ltd.

(57) ABSTRACT

Beverage products are provided which include rebaudioside A, erythritol, and an acid component. The beverage product has a titratable acidity in the range of about 8.75 to about 10.25, and a pH in the range of about 2.8 to about 3.3. Beverage products disclosed herein achieve a proper sweet/tart ratio to increase sweetness and to reduce tartness and bitterness of beverages made with natural sweeteners.

15 Claims, No Drawings

U.S. PATENT DOCUMENTS

| | | |
|---|---|---|
| 6,265,012 B1 | 7/2001 | Shamil |
| 6,361,812 B1 | 3/2002 | Ekanayake et al. |
| 6,375,992 B1 | 4/2002 | Blumenstein-Stahl et al. |
| 6,376,005 B2 | 4/2002 | Bunger et al. |
| 6,391,864 B1 | 5/2002 | Stone |
| 6,413,561 B1 | 7/2002 | Sass et al. |
| 6,416,806 B1 | 7/2002 | Zhou |
| 6,432,464 B1 | 8/2002 | Andersen et al. |
| 6,432,470 B2 | 8/2002 | Chaen et al. |
| 6,432,929 B1 | 8/2002 | Stone |
| 6,544,577 B1 | 4/2003 | Chu et al. |
| 6,558,723 B2 | 5/2003 | Ekanayake et al. |
| 6,589,555 B2 | 7/2003 | Pandya |
| 6,599,553 B2 | 7/2003 | Kealey et al. |
| 6,616,955 B2 | 9/2003 | Nunes et al. |
| 6,632,449 B2 | 10/2003 | Niehoff |
| 6,652,901 B2 | 11/2003 | Ishii |
| 6,682,766 B2 | 1/2004 | Blumenstein-Stahl et al. |
| 6,703,056 B2 | 3/2004 | Mehansho et al. |
| 6,706,295 B2 | 3/2004 | Mehansho et al. |
| 6,749,879 B2 | 6/2004 | Broz |
| 6,749,881 B2 | 6/2004 | Kataoka et al. |
| 6,759,067 B1 | 7/2004 | Ogasawara et al. |
| 6,759,073 B2 | 7/2004 | Heisey et al. |
| 6,780,443 B1 | 8/2004 | Nakatsu et al. |
| 6,783,789 B2 | 8/2004 | Mutilangi et al. |
| 6,794,375 B2 | 9/2004 | Sarama et al. |
| 6,821,545 B2 | 11/2004 | Bernhardt et al. |
| 6,838,106 B2 | 1/2005 | Kumamoto et al. |
| 6,838,107 B1 | 1/2005 | Bakal et al. |
| 6,838,109 B2 | 1/2005 | Nunes et al. |
| 6,890,567 B2 | 5/2005 | Nakatsu et al. |
| 6,899,901 B2 | 5/2005 | Nakatsu et al. |
| 6,984,376 B2 | 1/2006 | Stephenson et al. |
| 6,986,906 B2 | 1/2006 | Selzer et al. |
| 7,029,717 B1 | 4/2006 | Ojima et al. |
| 7,033,629 B2 | 4/2006 | Koss et al. |
| 7,052,725 B2 | 5/2006 | Chang et al. |
| 7,056,548 B2 | 6/2006 | Ogura et al. |
| 7,090,883 B2 | 8/2006 | Phipps |
| 7,105,190 B2 | 9/2006 | Ekanayake et al. |
| 2002/0004092 A1 | 1/2002 | Riha, III et al. |
| 2002/0102331 A1 | 8/2002 | Chang et al. |
| 2002/0122847 A1 | 9/2002 | Nunes et al. |
| 2002/0132037 A1 | 9/2002 | Zhou |
| 2002/0160090 A1 | 10/2002 | Lee et al. |
| 2002/0197371 A1 | 12/2002 | Lee et al. |
| 2003/0003212 A1 | 1/2003 | Chien et al. |
| 2003/0026872 A1 | 2/2003 | Dake et al. |
| 2003/0035875 A1 | 2/2003 | Dulebohn et al. |
| 2003/0059511 A1 | 3/2003 | Ishii |
| 2003/0096047 A1 | 5/2003 | Riha, III et al. |
| 2003/0190396 A1 | 10/2003 | Merkel et al. |
| 2003/0211214 A1 | 11/2003 | Riha, III et al. |
| 2003/0224095 A2 | 12/2003 | DuBois et al. |
| 2003/0236399 A1 | 12/2003 | Zheng et al. |
| 2004/0022914 A1 | 2/2004 | Allen |
| 2004/0076728 A2 | 4/2004 | Merkel et al. |
| 2004/0115329 A1 | 6/2004 | Tamiya et al. |
| 2004/0151771 A1 | 8/2004 | Gin et al. |
| 2004/0170735 A2 | 9/2004 | Merkel et al. |
| 2004/0197453 A1 | 10/2004 | Hirao et al. |
| 2004/0247669 A1 | 12/2004 | Gin et al. |
| 2005/0069616 A1 | 3/2005 | Lee et al. |
| 2005/0106305 A1 | 5/2005 | Abraham et al. |
| 2005/0136169 A1 | 6/2005 | Haung et al. |
| 2005/0152997 A1 | 7/2005 | Selzer et al. |
| 2005/0158444 A1 | 7/2005 | Koski |
| 2005/0208192 A1 | 9/2005 | Nakakura et al. |
| 2005/0220964 A1 | 10/2005 | Rizo et al. |
| 2005/0226983 A1 | 10/2005 | Bakal et al. |
| 2005/0260328 A1 | 11/2005 | Lutz et al. |
| 2006/0019019 A1 | 1/2006 | Rohaly et al. |
| 2006/0034873 A1 | 2/2006 | Radke et al. |
| 2006/0034897 A1 | 2/2006 | Boghani et al. |
| 2006/0068072 A9 | 3/2006 | Lee et al. |
| 2006/0068073 A1 | 3/2006 | Catani et al. |
| 2006/0073254 A1 | 4/2006 | Catani et al. |
| 2006/0083838 A1 | 4/2006 | Jackson et al. |
| 2006/0093720 A1 | 5/2006 | Tatz |
| 2006/0099309 A1 | 5/2006 | Mattson et al. |
| 2006/0099318 A1 | 5/2006 | Iwasaki et al. |
| 2006/0127450 A1 | 6/2006 | Chinen |
| 2006/0134291 A1 | 6/2006 | Rathjen |
| 2006/0134292 A1 | 6/2006 | Abelyan et al. |
| 2006/0134294 A1 | 6/2006 | McKee et al. |
| 2006/0142555 A1 | 6/2006 | Jonnala et al. |
| 2006/0159818 A1 | 7/2006 | Kunieda |
| 2006/0159820 A1 | 7/2006 | Rathjen et al. |
| 2006/0177559 A1 | 8/2006 | Gosselin et al. |
| 2006/0204550 A1 | 9/2006 | Hassen |
| 2007/0116800 A1 | 5/2007 | Prakask et al. |
| 2007/0116819 A1 | 5/2007 | Prakash et al. |
| 2007/0116820 A1 | 5/2007 | Prakask et al. |
| 2007/0116821 A1 | 5/2007 | Prakask et al. |
| 2007/0116822 A1 | 5/2007 | Prakask et al. |
| 2007/0116823 A1 | 5/2007 | Prakask et al. |
| 2007/0116824 A1 | 5/2007 | Prakask et al. |
| 2007/0116825 A1 | 5/2007 | Prakash et al. |
| 2007/0116826 A1 | 5/2007 | Prakash et al. |
| 2007/0116827 A1 | 5/2007 | Prakash et al. |
| 2007/0116828 A1 | 5/2007 | Prakash et al. |
| 2007/0116829 A1 | 5/2007 | Prakash et al. |
| 2007/0116830 A1 | 5/2007 | Prakash et al. |
| 2007/0116831 A1 | 5/2007 | Prakash et al. |
| 2007/0116832 A1 | 5/2007 | Prakash et al. |
| 2007/0116833 A1 | 5/2007 | Prakash et al. |
| 2007/0116834 A1 | 5/2007 | Prakash et al. |
| 2007/0116835 A1 | 5/2007 | Prakash et al. |
| 2007/0116836 A1 | 5/2007 | Prakash et al. |
| 2007/0116837 A1 | 5/2007 | Prakash et al. |
| 2007/0116838 A1 | 5/2007 | Prakash et al. |
| 2007/0116839 A1 | 5/2007 | Prakash et al. |
| 2007/0116840 A1 | 5/2007 | Prakash et al. |
| 2007/0116841 A1 | 5/2007 | Prakash et al. |
| 2007/0128311 A1 | 6/2007 | Prakash et al. |
| 2007/0134390 A1 | 6/2007 | Prakash et al. |
| 2007/0134391 A1 | 6/2007 | Prakash et al. |
| 2007/0224321 A1 | 9/2007 | Prakash et al. |
| 2007/0275147 A1 | 11/2007 | Prakash et al. |
| 2007/0292582 A1 | 12/2007 | Prakash et al. |
| 2008/0107775 A1 | 5/2008 | Prakash et al. |
| 2008/0107776 A1 | 5/2008 | Prakash et al. |
| 2008/0107787 A1 | 5/2008 | Prakash et al. |
| 2008/0108710 A1 | 5/2008 | Prakash et al. |
| 2008/0226773 A1 | 9/2008 | Lee et al. |
| 2008/0226776 A1 | 9/2008 | Roy et al. |
| 2008/0226787 A1 | 9/2008 | Johnson et al. |
| 2008/0226788 A1 | 9/2008 | Chang et al. |
| 2008/0226789 A1 | 9/2008 | Roy et al. |
| 2008/0226790 A1 | 9/2008 | Johnson et al. |
| 2008/0226793 A1 | 9/2008 | Chang et al. |
| 2008/0226794 A1 | 9/2008 | Bell et al. |
| 2008/0226795 A1 | 9/2008 | May et al. |
| 2008/0226796 A1 | 9/2008 | Lee et al. |
| 2008/0226797 A1 | 9/2008 | Lee et al. |
| 2008/0226798 A1 | 9/2008 | Talebi et al. |
| 2008/0226799 A1 | 9/2008 | Lee et al. |
| 2008/0226800 A1 | 9/2008 | Lee et al. |
| 2008/0226801 A1 | 9/2008 | May et al. |
| 2008/0226802 A1 | 9/2008 | Lee et al. |
| 2008/0226803 A1 | 9/2008 | Letourneau et al. |
| 2008/0226804 A1 | 9/2008 | Talebi et al. |
| 2008/0254185 A1 | 10/2008 | Yamakawa et al. |
| 2008/0292764 A1 | 11/2008 | Prakash et al. |
| 2008/0292775 A1 | 11/2008 | Prakash et al. |
| 2009/0053378 A1 | 2/2009 | Prakash et al. |
| 2009/0074935 A1 | 3/2009 | Lee et al. |
| 2009/0162484 A1 | 6/2009 | Bell et al. |
| 2009/0162487 A1 | 6/2009 | Bell et al. |
| 2009/0162488 A1 | 6/2009 | Bell et al. |
| 2010/0112138 A1 | 5/2010 | Roy et al. |

FOREIGN PATENT DOCUMENTS

| | | |
|---|---|---|
| CN | 1390501 | 1/2003 |
| EP | 0 287 957 A1 | 10/1988 |
| EP | 0 470 259 A1 | 2/1992 |

| JP | 59183670 | | 10/1984 |
| JP | 60188035 | A | 9/1985 |
| JP | 09-19370 | A | 7/1997 |
| JP | 1998-136952 | A | 5/1998 |
| JP | 1998-150958 | A | 6/1998 |
| JP | 2000270804 | A | 10/2000 |
| RU | 2003134642 | | 4/2002 |
| SU | 1355227 | | 11/1987 |
| WO | 99/34689 | A | 7/1999 |
| WO | 02/087358 | A | 11/2002 |
| WO | 02087358 | | 11/2002 |
| WO | WO 2005/112668 | | 12/2005 |
| WO | WO 2006/072921 | | 7/2006 |
| WO | WO 2006/095366 | | 9/2006 |
| WO | WO 2006/127935 | | 11/2006 |

OTHER PUBLICATIONS

Office Action for corresponding U.S. Appl. No. 11/686,102 mailed on Nov. 1, 2010.

Communication of a Notice of Opposition dated Dec. 21, 2011 in European Application No. 08743825.5.

Results of experiments performed by the Opponent in order to reproduce Example 1 of the Patent in Dispute (Declaration of Indra Prakash dated Dec. 1, 2011).

Results of experiments performed by an independent expert (SRL Research, Enterprise Ireland Webworks, Ellington Street, Cork, Ireland) in order to reproduce Example 1 of the Patent in Dispute (Memorandum dated Nov. 30, 2011).

A.D. Kinghorn (Ed.), *Stevia*: The Genus *Stevia*, Taylor & Francis, 2002, Chapter 9: Use of *Stevia rebaudiana* sweeteners in Japan.

0.-A. Neumuller, Rompps Chemie Lexikon, 8. Ed., 1981, Franckh'sche Verlagshandlung, Stuttgart.

Titratable Acidity Tests (www.resultsnowtests.biz).

Extract from the Innova database regarding the composition of "Coca-Cola Powerade Drink" taken from www.innovadatabase.com.

* cited by examiner

BEVERAGE PRODUCTS HAVING STEVIOL GLYCOSIDES AND AT LEAST ONE ACID

RELATED APPLICATION

This application is a Continuation-in-Part of co-pending prior application U.S. Ser. No. 11/686,120, filed Mar. 14, 2007, entitled, "Beverage Products Having Steviol Glycosides and at Least One Acid," the entire disclosure of which is herein incorporated by reference.

FIELD OF THE INVENTION

This invention relates to beverages and other beverage products, such as beverage concentrates, etc. In particular, this invention relates to beverages and other beverage products having formulations incorporating non-nutritive sweeteners and being suitable to meet market demand for alternative nutritional characteristics or flavor profiles in beverages.

BACKGROUND

It has long been known to produce beverages of various formulations. Improved and new formulations are desirable to meet changing market demands. In particular, there is perceived market demand for beverages having alternative nutritional characteristics, including, for example, alternative calorie content. Also, there is perceived market demand for beverages having alternative flavor profiles, including good taste and mouthfeel. In addition, there is consumer interest in beverages and other beverage products, such as beverage concentrates, etc. whose formulations make greater use of natural ingredients, that is, ingredients distilled, extracted, concentrated or similarly obtained from harvested plants and other naturally occurring sources, with limited or no further processing.

The development of new beverage formulations, for example, new beverage formulations employing alternative sweeteners, flavorants, flavor enhancing agents and the like, presents challenges in addressing associated bitterness and/or other off-tastes. In addition, such challenges typically are presented in new beverage formulations developed for alternative nutritional and/or flavor profiles. Also, there is need for new beverage formulations which can satisfactorily meet the combination of objectives including nutritional characteristics, flavor, shelf life, and other objectives.

Development of new beverage formulations has faced obstacles. For example, U.S. Pat. No. 4,956,191 suggests that carbonated beverages which contain blends of saccharin or the Stevia extract with aspartame tend to be less organoleptically pleasing than those containing sugar.

It is therefore an object of the present invention to provide beverages and other beverage products. It is an object of at least certain embodiments of the invention (that is, not necessarily all embodiments of the invention) to provide beverages and other beverage products having desirable taste properties. It is an object of at least certain (but not necessarily all) embodiments of the invention to provide beverages and other beverage products having improved formulations. These and other objects, features and advantages of the invention or of certain embodiments of the invention will be apparent to those skilled in the art from the following disclosure and description of exemplary embodiments.

SUMMARY

In accordance with a first aspect, a beverage product is provided comprising rebaudioside A, erythritol, and at least one acid, wherein the beverage has a titratable acidity in the range of about 8.75 to about 10.25, and a pH in the range of about 2.8 to about 3.3

In certain exemplary embodiments, the beverage product may further include at least one steviol glycoside selected from the group consisting of stevioside, a steviolbioside, dulcoside A, rebaudioside B, rebaudioside C, rebaudioside D, rebaudioside E, and mixtures thereof. In certain exemplary embodiments, the beverage product may further include tagatose. In certain exemplary embodiments, erythritol is present in the beverage product in the range of 1.0% to 4.5% by weight of the beverage product, e.g., 2.5% to 3.5%, or 2.8% to 3.5%. In certain exemplary embodiments, the acid is selected from the group consisting of citric acid, phosphoric acid, malic acid, tartaric acid, lactic acid, fumaric acid, ascorbic acid, gluconic acid, succinic acid, maleic acid, adipic acid, cinnamic acid, glutaric acid, and mixtures of any of them, e.g., a mixture of phosphoric and citric acid. In certain exemplary embodiments, the acid is present in the beverage product in the range of 0.01% to 1.0% by weight of the beverage product, e.g., 0.05% to 0.5%, or 0.1% to 0.25%. In certain exemplary embodiments, the beverage product has a titratable acidity of 9 to 10, e.g., 9. In certain exemplary embodiments, the beverage product has a pH in the range of 3.0 to 3.2. In certain exemplary embodiments, the beverage product may be a carbonated soft drink, a non-carbonated soft drink, a fountain beverage, a frozen ready-to-drink beverage, a coffee beverage, a tea beverage, a dairy beverage, a flavored water, an enhanced water, a fruit juice, a fruit juice-flavored drink, a sport drink, and an alcoholic beverage.

In accordance with another aspect, a natural beverage is provided comprising rebaudioside A, erythritol, and at least one acid, wherein the natural beverage has a titratable acidity in the range of about 8.75 to about 10.25, and a pH in the range of about 2.8 to about 3.3.

In accordance with another aspect, a beverage concentrate is provided comprising rebaudioside A, erythritol, and at least one acid, wherein the beverage concentrate when combined with water produces a full strength beverage having a titratable acidity in the range of about 8.75 to about 10.25 and a pH in the range of about 2.8 to about 3.3.

In accordance with another aspect, a clear beverage is provided comprising at rebaudioside A, erythritol, and at least one acid, wherein the clear beverage has a titratable acidity of about 8.75 to about 10.25, and a pH of about 2.8 to about 3.3. As used here, substantially clear means that the beverages have substantially no turbidity and substantially no color.

It will be appreciated by those skilled in the art, given the benefit of the following description of certain exemplary embodiments of the beverage and other beverage products disclosed here, that at least certain embodiments of the invention have improved or alternative formulations suitable to provide desirable taste profiles, nutritional characteristics, etc. These and other aspects, features and advantages of the invention or of certain embodiments of the invention will be further understood by those skilled in the art from the following description of exemplary embodiments.

DETAILED DESCRIPTION OF CERTAIN EXEMPLARY EMBODIMENTS

It should be understood that beverages and other beverage products in accordance with this disclosure may have any of numerous different specific formulations or constitutions. The formulation of a beverage product in accordance with this disclosure may vary to a certain extent, depending upon such factors as the product's intended market segment, its desired nutritional characteristics, flavor profile and the like. For example, it will generally be an option to add further ingredients to the formulation of a particular beverage embodiment, including any of the beverage formulations described below. Additional (i.e., more and/or other) sweeteners may be added, flavorings, electrolytes, vitamins, fruit juices or other fruit products, tastents, masking agents and the like, flavor enhancers, and/or carbonation typically may be added to any such formulations to vary the taste, mouthfeel, nutritional characteristics, etc. In general, a beverage in accordance with this disclosure typically comprises at least water, sweetener, acidulant and flavoring. Exemplary flavorings which may be suitable for at least certain formulations in accordance with this disclosure include cola flavoring, citrus flavoring, spice flavorings and others. Carbonation in the form of carbon dioxide may be added for effervescence. Preservatives may be added if desired, depending upon the other ingredients, production technique, desired shelf life, etc. Optionally, caffeine may be added. Certain exemplary embodiments of the beverages disclosed here are cola-flavored carbonated beverages, characteristically containing carbonated water, sweetener, kola nut extract and/or other flavoring, caramel coloring, phosphoric acid, and optionally other ingredients. Additional and alternative suitable ingredients will be recognized by those skilled in the art given the benefit of this disclosure.

The beverage products disclosed here include beverages, i.e., ready to drink liquid formulations, beverage concentrates and the like. Beverages include, e.g., carbonated and non-carbonated soft drinks, fountain beverages, frozen ready-to-drink beverages, coffee beverages, tea beverages, dairy beverages, powdered soft drinks, as well as liquid concentrates, flavored waters, enhanced waters, fruit juice and fruit juice-flavored drinks, sport drinks, and alcoholic products. The terms "beverage concentrate" and "syrup" are used interchangeably throughout this disclosure. At least certain exemplary embodiments of the beverage concentrates contemplated are prepared with an initial volume of water to which the additional ingredients are added. Full strength beverage compositions may be formed from the beverage concentrate by adding further volumes of water to the concentrate. Typically, for example, full strength beverages may be prepared from the concentrates by combining approximately 1 part concentrate with between approximately 3 to approximately 7 parts water. In certain exemplary embodiments the full strength beverage is prepared by combining 1 part concentrate with 5 parts water. In certain exemplary embodiments the additional water used to form the full strength beverages is carbonated water. In certain other embodiments, a full strength beverage is directly prepared without the formation of a concentrate and subsequent dilution.

Natural embodiments of the beverage products disclosed here are natural in that they do not contain anything artificial or synthetic (including any color additives regardless of source) that would not normally be expected to be in the food. As used herein, therefore, a "natural" beverage composition is defined in accordance with the following guidelines: Raw materials for a natural ingredient exists or originates in nature. Biological synthesis involving fermentation and enzymes can be employed, but synthesis with chemical reagents is not utilized. Artificial colors, preservatives, and flavors are not considered natural ingredients. Ingredients may be processed or purified through certain specified techniques including at least: physical processes, fermentation, and enzymolysis. Appropriate processes and purification techniques include at least: absorption, adsorption, agglomeration, centrifugation, chopping, cooking (baking, frying, boiling, roasting), cooling, cutting, chromatography, coating, crystallization, digestion, drying (spray, freeze drying, vacuum), evaporation, distillation, electrophoresis, emulsification, encapsulation, extraction, extrusion, filtration, fermentation, grinding, infusion, maceration, microbiological (rennet, enzymes), mixing, peeling, percolation, refrigeration/freezing, squeezing, steeping, washing, heating, mixing, ion exchange, lyophilization, osmose, precipitation, salting out, sublimation, ultrasonic treatment, concentration, flocculation, homogenization, reconstitution, enzymolysis (using enzymes found in nature). Processing aids (currently defined as substances used as manufacturing aids to enhance the appeal or utility of a food component, including clarifying agents, catalysts, flocculants, filter aids, and crystallization inhibitors, etc. See 21 CFR §170.3(o)(24)) are considered incidental additives and may be used if removed appropriately.

Water is a basic ingredient in the beverage products disclosed here, typically being the vehicle or primary liquid portion in which the remaining ingredients are dissolved, emulsified, suspended or dispersed. Purified water can be used in the manufacture of certain embodiments of the beverages disclosed here, and water of a standard beverage quality can be employed in order not to adversely affect beverage taste, odor, or appearance. The water typically will be clear, colorless, free from objectionable minerals, tastes and odors, free from organic matter, low in alkalinity and of acceptable microbiological quality based on industry and government standards applicable at the time of producing the beverage. In certain typical embodiments, water is present at a level of from about 80% to about 99.9% by weight of the beverage. In at least certain exemplary embodiments the water used in beverages and concentrates disclosed here is "treated water," which refers to water that has been treated to reduce the total dissolved solids of the water prior to optional supplementation, e.g., with calcium as disclosed in U.S. Pat. No. 7,052,725. Methods of producing treated water are known to those of ordinary skill in the art and include deionization, distillation, filtration and reverse osmosis ("r-o"), among others. The terms "treated water," "purified water," "demineralized water," "distilled water," and "r-o water" are understood to be generally synonymous in this discussion, referring to water from which substantially all mineral content has been removed, typically containing no more than about 500 ppm total dissolved solids, e.g. 250 ppm total dissolved solids.

The steviol glycoside include, e.g., rebaudiosides, such as rebaudioside A, stevioside, and related compounds for sweetening. These compounds may be obtained by extraction or the like from the stevia plant. Stevia (e.g., Stevia rebaudiana bectoni) is a sweet-tasting plant. The leaves contain a complex mixture of natural sweet diterpene glycosides. Steviol glycosides and rebaudiosides are components of Stevia that contribute sweetness. Typically, these compounds are found to include stevioside (4-13% dry weight), steviolbioside (trace), the rebaudiosides, including rebaudioside A (2-4%), rebaudioside B (trace), rebaudioside C (1-2%), rebaudioside D (trace), and rebaudioside E (trace), and dulcoside A (0.4-0.7%). The following nonsweet constituents also have been identified in the leaves of stevia plants: labdane, diterpene, triterpenes, sterols, flavonoids, volatile oil constituents, pigments, gums and inorganic matter. Generally, the beverage products disclosed herein may include at least one steviol glycoside, for example, rebaudioside A, rebaudioside B, rebaudioside C, rebaudioside D, rebaudioside E, stevioside, steviolbioside, dulcoside A, a Stevia rebaudiana extract, or mixtures of any of them.

The at least one acid used in the beverages products disclosed herein may serve any one or more of several functions, including, for example, lending tartness to the taste of the beverage, enhancing palatability, increasing thirst quenching effect, modifying sweetness and acting as a mild preservative. Suitable acids are known and will be apparent to those skilled in the art given the benefit of this disclosure. Exemplary acids suitable for use in some or all embodiments of the beverage products disclosed here include phosphoric acid, citric acid, malic acid, tartaric acid, lactic acid, fumaric acid, ascorbic acid, gluconic acid, succinic acid, maleic acid, adipic acid, cinnamic acid, glutaric acid, and mixtures of any of them. Typically, the acid is phosphoric acid, citric acid, malic acid, or combinations thereof such as phosphoric acid and citric acid.

Titratable acidity is an indication of the total acidity of a beverage product. Titratable acidity measures the amount of alkali required to neutralize the acid of a given volume of beverage. The titratable acidity is the millimeter of 0.1 N NaOH required to titrate 100 ml of beverage to a pH 8.75 end point with a potentiometer. The titratable acidity of the beverage product comprising rebaudioside A, erythritol, and at least one acid is typically about 8.75 to about 10.5, preferably about 9 to about 10. Suitable titratable acidities include, e.g., about 9, 9.25, 9.5, 9.75, 10, or 10.25.

The acid may be used in solution form, for example, and in an amount sufficient to provide the desired pH of the beverage. The particular acid or acids chosen and the amount used will depend, in part, on the other ingredients, the desired shelf life of the beverage product, as well as effects on the beverage pH, titratable acidity, and taste. Typically, for example, the one or more acids of the acidulant are used in an amount, collectively, of from about 0.01% to about 1.0% by weight of the beverage, e.g., from about 0.01% to about 0.5% by weight, from about 0.05% to about 0.5% by weight, from about 0.05% to about 0.25% by weight, from about 0.1% to about 0.25% by weight, depending upon the acidulant used, desired pH, other ingredients used, etc. The pH of at least certain exemplary embodiments of the beverages disclosed here may be a value within the range of from about 2.8 to about 3.3, preferably from about 3.0 to about 3.2, e.g., 3.1. The acid in certain exemplary embodiments enhances beverage flavor. Too much acid may impair the beverage flavor and result in tartness or other off-taste, while too little acid may make the beverage taste flat.

Those skilled in the art, given the benefit of this disclosure, will recognize that when preparing beverage products containing sweeteners in addition to the steviol glycoside such as peptide-based artificial sweeteners such as aspartame, the resulting beverage composition is best maintained below a certain pH to retain the sweetening effect of the artificial sweetener. In the formation of calcium-supplemented beverages, the presence of calcium salts increases the pH which requires additional acids to both assist the dissolution of the salt and maintain a desirable pH for stability of the artificial sweetener. The presence of the additional acid in the beverage composition, which increases the titratable acidity of the composition, will result in a more tart or sour taste to the resulting beverage. It will be within the ability of those skilled in the art, given the benefit of this disclosure, to select a suitable acid or combination of acids and the amounts of such acids for the acidulant component of any particular embodiment of the beverage products disclosed here.

In addition to rebaudioside A and erythritol, optionally additional sweetener may be used in the beverage produced disclosed herein. Such optional additional sweeteners suitable for use in various exemplary embodiments of beverage products comprising rebaudioside A, erythritol, and at least one acid include natural and artificial or synthetic sweeteners. Suitable sweeteners and combinations of sweeteners are selected for the desired nutritional characteristics, taste profile for the beverage, mouthfeel and other organoleptic factors. As used herein, "taste" refers to a combination of sweetness perception, temporal effects of sweetness perception, i.e., on-set and duration, off-tastes, e.g. bitterness and metallic taste, residual perception (aftertaste) and tactile perception, e.g. body and thickness. As used herein, a "full-calorie" beverage formulation is one fully sweetened with a nutritive sweetener. The term "nutritive sweetener" refers generally to sweeteners which provide significant caloric content in typical usage amounts, e.g., more than about 5 calories per 8 oz. serving of beverage. As used herein, a "potent sweetener" means a sweetener which is at least twice as sweet as sugar, that is, a sweetener which on a weight basis requires no more than half the weight of sugar to achieve an equivalent sweetness. For example, a potent sweetener may require less than one-half the weight of sugar to achieve an equivalent sweetness in a beverage sweetened to a level of 10 degrees Brix with sugar. Potent sweeteners include both nutritive (e.g., Lo Han Guo juice concentrate) and non-nutritive sweeteners (e.g., typically, Lo Han Guo powder). In addition, potent sweeteners include both natural potent sweeteners (e.g., steviol glycosides, Lo Han Guo, etc.) and artificial potent sweeteners (e.g., neotame, etc.). However, for natural beverage products disclosed here, only natural potent sweeteners are employed. Commonly accepted potency figures for certain potent sweeteners include, for example,

| | |
|---|---|
| Cyclamate | 30 times as sweet as sugar |
| Stevioside | 100-250 times as sweet as sugar |
| Mogroside V | 100-300 times as sweet as sugar |
| Rebaudioside A | 150-300 times as sweet as sugar |
| Acesulfame-K | 200 times as sweet as sugar |
| Aspartame | 200 times as sweet as sugar |
| Saccharin | 300 times as sweet as sugar |
| Neohesperidin dihydrochalcone | 300 times as sweet as sugar |
| Sucralose | 600 times as sweet as sugar |
| Neotame | 8,000 times as sweet as sugar |

Sweeteners suitable for at least certain exemplary embodiments include, for example, sugar alcohols such as sorbitol, mannitol, xylitol, lactitol, isomalt, and malitol. Other sweeteners include tagatose, e.g., D-tagatose, and combinations of tagatose with the sugar alcohol erythritol. In certain exemplary embodiments, the beverage products disclosed herein comprise erythritol in the range of about 1.0% to about 4.5% by weight of the beverage, e.g., about 2.5% to about 3.5% by weight, or about 2.8% to about 3.5% by weight.

As further discussed below, exemplary natural nutritive sweeteners suitable for some or all embodiments of the beverage products disclosed here include crystalline or liquid sucrose, fructose, glucose, dextrose, maltose, trehalose, fructo-oligosaccharides, glucose-fructose syrup from natural sources such as apple, chicory, honey, etc., e.g., high fructose corn syrup, invert sugar and the like and mixtures of any of them; exemplary artificial sweeteners suitable for some or all embodiments of the beverages disclosed here include saccharin, cyclamate, aspartame, other dipeptides, acesulfame potassium, and other such potent sweeteners, and mixtures of any of them; and exemplary natural non-nutritive potent sweeteners suitable for some or all embodiments of the beverages disclosed here include steviol glycosides (e.g., stevioside, steviolbioside, dulcoside A, rebaudioside A, rebaudioside B, rebaudioside C, rebaudioside D, rebaudioside E, mixtures of any of them, etc.) and Lo Han Guo and related compounds, and mixtures of any of them. Lo Han Guo is a potent sweetener which can be provided as a natural nutritive or natural non-nutritive sweetener. For example, Lo Han Guo juice concentrate may be a nutritive sweetener, and Lo Han Guo powder may be a non-nutritive sweetener. Also, in at least certain exemplary embodiments of the beverages disclosed here, combinations of one or more natural nutritive sweeteners, one or more artificial sweeteners and/or one or more natural non-nutritive potent sweeteners are used to provide the sweetness and other aspects of desired taste profile and nutritive characteristics. It should also be recognized that certain such sweeteners will, either in addition or instead, act as tastents, masking agents or the like in various embodiments of the beverages disclosed here, e.g., when used in amounts below its (or their) sweetness perception threshold in the beverage in question.

The sweeteners included in the formulations of the beverage products disclosed here are edible consumables suitable for consumption and for use in beverages. By "edible consumables" is meant a food or beverage or an ingredient of a food or beverage for human or animal consumption. The sweetener or sweetening agent used here and in the claims may be a nutritive or non-nutritive, natural or synthetic beverage ingredient or additive (or mixtures of them) which provides sweetness to the beverage, i.e., which is perceived as sweet by the sense of taste. The perception of flavoring agents and sweetening agents may depend to some extent on the interrelation of elements. Flavor and sweetness may also be perceived separately, i.e., flavor and sweetness perception may be both dependent upon each other and independent of each other. For example, when a large amount of a flavoring agent is used, a small amount of a sweetening agent may be readily perceptible and vice versa. Thus, the oral and olfactory interaction between a flavoring agent and a sweetening agent may involve the interrelationship of elements.

In at least certain exemplary embodiments of beverage products comprising rebaudioside A, erythritol, and at least one acid disclosed here, the sweetener component may include as an optional additional sweetener, nutritive, natural crystalline or liquid sweeteners such as sucrose, liquid sucrose, fructose, liquid fructose, glucose, liquid glucose, glucose-fructose syrup from natural sources such as apple, chicory, honey, etc., e.g., high fructose corn syrup, invert sugar, maple syrup, maple sugar, honey, brown sugar molasses, e.g., cane molasses, such as first molasses, second molasses, blackstrap molasses, and sugar beet molasses, sorghum syrup, and/or others. Such sweeteners are present in at least certain exemplary embodiments in an amount of from about 0.1% to about 20% by weight of the beverage, such as from about 6% to about 16% by weight, depending upon the desired level of sweetness for the beverage. To achieve desired beverage uniformity, texture and taste, in certain exemplary embodiments of the natural beverage products disclosed here, standardized liquid sugars as are commonly employed in the beverage industry can be used. Typically such standardized sweeteners are free of traces of nonsugar solids which could adversely affect the flavor, color or consistency of the beverage.

The term "nutritive sweetener" refers generally to sweeteners which provide significant caloric content in typical usage amounts, e.g., more than about 5 calories per 8 oz. serving of beverage. As used herein, a "full-calorie" beverage formulation is one fully sweetened with a nutritive sweetener. As used herein, a "non-nutritive sweetener" is one which does not provide significant caloric content in typical usage amounts, i.e., is one which imparts less than 5 calories per 8 oz. serving of beverage to achieve the sweetness equivalent of 10 Brix of sugar. As used herein, "reduced calorie beverage" means a beverage having at least a 25% reduction in calories per 8 oz. serving of beverage as compared to the full calorie version, typically a previously commercialized full-calorie version. As used herein, a "low-calorie beverage" has fewer than 40 calories per 8 oz. serving of beverage. As used herein, "zero-calorie" or "diet" means having less than 5 calories per serving, e.g., per 8 oz. for beverages.

Artificial and natural non-nutritive potent sweeteners are suitable for use in at least certain exemplary embodiments of the beverages comprising at least one steviol glycoside and at least one acid disclosed here. Such artificial potent sweeteners include peptide based sweeteners, for example, aspartame, neotame, and alitame, and non-peptide based sweeteners, for example, sodium saccharin, calcium saccharin, acesulfame potassium, sodium cyclamate, calcium cyclamate, neohesperidin dihydrochalcone, and sucralose. Alitame may be less desirable for caramel-containing beverages where it has been known to form a precipitate. In certain exemplary embodiments the beverage product employs aspartame as the sweetener, either alone or with other sweeteners. In certain other exemplary embodiments the sweetener comprises aspartame and acesulfame potassium. The natural non-nutritive potent sweeteners include, for example, steviol glycosides (e.g., stevioside, steviolbioside, dulcoside A, rebaudioside A, rebaudioside B, rebaudioside C, rebaudioside D, rebaudioside E, mixtures of any of them, etc.), Lo Han Guo and related compounds, as discussed further below. Non-nutritive, high potency sweeteners typically are employed at a level of milligrams per fluid ounce of beverage, according to their sweetening power, any applicable regulatory provisions of the country where the beverage is to be marketed, the desired level of sweetness of the beverage, etc. It will be within the ability of those skilled in the art, given the benefit of this disclosure, to select suitable additional or alternative sweeteners for use in various embodiments of the beverage products disclosed here.

The sweetener Lo Han Guo, which has various different spellings and pronunciations, may be obtained from fruit of the plant family Cucurbitaceae, tribe Jollifieae, subtribe Thladianthinae, genus *Siraitia*. Lo Han Guo often is obtained from the genus/species *S. grosvenorii, S. siamensis, S. silomaradjae, S. sikkimensis, S. africana, S. borneensis*, and *S. taiwaniana*. Suitable fruit includes that of the genus/species *S. grosvenorii*, which is often called Luo Han fruit. Lo Han Guo contains triterpene glycosides or mogrosides, which constituents may be used as Lo Han Guo sweeteners. Luo Han Guo may be used as the juice or juice concentrate, powder, etc. LHG juice concentrate may contain about 3 wt. % to about 12 wt. %, e.g., about 6 wt. % mogrosides, such as mogroside V, mogroside IV, (11-oxo-mogroside V), siamenoside and mixtures thereof. Lo Han Guo may be produced, for example, as discussed in U.S. Pat. No. 5,411,755. Sweeteners from other fruits, vegetables or plants also may be used as natural or processed sweeteners or sweetness enhancers in at least certain exemplary embodiments of the beverages disclosed here.

Other exemplary sweeteners include glycyrrhizin, neohesperidin dihydrochalcone, lactose, xylose, arabinose and ribose, and protein sweeteners such as thaumatin, monatin, monellin, brazzein, L-alanine and glycine.

Certain exemplary embodiments of the beverage products disclosed here also may contain small amounts of alkaline agents to adjust pH. Such agents include, e.g., potassium citrate and sodium citrate. For example, the alkaline agent potassium hydroxide may be used in an amount of from about 0.005 wt. % to about 0.02 wt. % (by weight of the beverage), with an amount of about 0.01% being typical for certain beverages. The amount will depend, of course, on the type of alkaline agents and on the degree to which the pH is to be adjusted.

The beverage products disclosed here optionally contain a flavor composition, for example, natural and synthetic fruit flavors, botanical flavors, other flavors, and mixtures thereof. As used here, the term "fruit flavor" refers generally to those flavors derived from the edible reproductive part of a seed plant. Included are both those wherein a sweet pulp is associated with the seed, e.g., banana, tomato, cranberry and the like, and those having a small, fleshy berry. The term berry also is used here to include aggregate fruits, i.e., not "true" berries, but fruit commonly accepted as such. Also included within the term "fruit flavor" are synthetically prepared flavors made to simulate fruit flavors derived from natural sources. Examples of suitable fruit or berry sources include whole berries or portions thereof, berry juice, berry juice concentrates, berry purees and blends thereof, dried berry powders, dried berry juice powders, and the like.

Exemplary fruit flavors include the citrus flavors, e.g., orange, lemon, lime grapefruit, tangerine, mandarin orange, tangelo, and pomelo, and such flavors as apple, grape, cherry, and pineapple flavors and the like, and mixtures thereof. In certain exemplary embodiments the beverage concentrates and beverages comprise a fruit flavor component, e.g., a juice concentrate or juice. As used here, the term "botanical flavor" refers to flavors derived from parts of a plant other than the fruit. As such, botanical flavors may include those flavors derived from essential oils and extracts of nuts, bark, roots and leaves. Also included within the term "botanical flavor" are synthetically prepared flavors made to simulate botanical flavors derived from natural sources. Examples of such flavors include cola flavors, tea flavors, and the like, and mixtures thereof. The flavor component may further comprise a blend of several of the above-mentioned flavors. In certain exemplary embodiments of the beverage concentrates and beverages a cola flavor component is used or a tea flavor component. The particular amount of the flavor component useful for imparting flavor characteristics to the beverages of the present invention will depend upon the flavor(s) selected, the flavor impression desired, and the form of the flavor component. Those skilled in the art, given the benefit of this disclosure, will be readily able to determine the amount of any particular flavor component(s) used to achieve the desired flavor impression.

Juices suitable for use in at least certain exemplary embodiments of the beverage products disclosed here include, e.g., fruit, vegetable and berry juices. Juices may be employed in the present invention in the form of a concentrate, puree, single-strength juice, or other suitable forms. The term "juice" as used here includes single-strength fruit, berry, or vegetable juice, as well as concentrates, purees, milks, and other forms. Multiple different fruit, vegetable and/or berry juices may be combined, optionally along with other flavorings, to generate a beverage having the desired flavor. Examples of suitable juice sources include plum, prune, date, currant, fig, grape, raisin, cranberry, pineapple, peach, banana, apple, pear, guava, apricot, Saskatoon berry, blueberry, plains berry, prairie berry, mulberry, elderberry, Barbados cherry (acerola cherry), choke cherry, date, coconut, olive, raspberry, strawberry, huckleberry, loganberry, currant, dewberry, boysenberry, kiwi, cherry, blackberry, quince, buckthorn, passion fruit, sloe, rowan, gooseberry, pomegranate, persimmon, mango, rhubarb, papaya, litchi, lemon, orange, lime, tangerine, mandarin and grapefruit etc. Numerous additional and alternative juices suitable for use in at least certain exemplary embodiments will be apparent to those skilled in the art given the benefit of this disclosure. In the beverages of the present invention employing juice, juice may be used, for example, at a level of at least about 0.2% by weight of the beverage. In certain exemplary embodiments juice is employed at a level of from about 0.2% to about 40% by weight of the beverage. Typically, juice may be used, if at all, in an amount of from about 1% to about 20% by weight.

Certain such juices which are lighter in color may be included in the formulation of certain exemplary embodiments to adjust the flavor and/or increase the juice content of the beverage without darkening the beverage color. Examples of such juices include apple, pear, pineapple, peach, lemon, lime, orange, apricot, grapefruit, tangerine, rhubarb, cassis, quince, passion fruit, papaya, mango, guava, litchi, kiwi, mandarin, coconut, and banana. Deflavored and decolored juices may be employed if desired.

Other flavorings suitable for use in at least certain exemplary embodiments of the beverage products disclosed here include, e.g., spice flavorings, such as cassia, clove, cinnamon, pepper, ginger, vanilla spice flavorings, cardamom, coriander, root beer, sassafras, ginseng, and others. Numerous additional and alternative flavorings suitable for use in at least certain exemplary embodiments will be apparent to those skilled in the art given the benefit of this disclosure. Flavorings may be in the form of an extract, oleoresin, juice concentrate, bottler's base, or other forms known in the art. In at least certain exemplary embodiments, such spice or other flavors complement that of a juice or juice combination.

The one or more flavorings may be used in the form of an emulsion. A flavoring emulsion may be prepared by mixing some or all of the flavorings together, optionally together with other ingredients of the beverage, and an emulsifying agent. The emulsifying agent may be added with or after the flavorings mixed together. In certain exemplary embodiments the emulsifying agent is water-soluble. Exemplary suitable emulsifying agents include gum acacia, modified starch, carboxymethylcellulose, gum tragacanth, gum ghatti and other suitable gums. Additional suitable emulsifying agents will be apparent to those skilled in the art of beverage formulations, given the benefit of this disclosure. The emulsifier in exemplary embodiments comprises greater than about 3% of the mixture of flavorings and emulsifier. In certain exemplary embodiments the emulsifier is from about 5% to about 30% of the mixture.

Carbon dioxide is used to provide effervescence to certain exemplary embodiments of the beverages disclosed here. Any of the techniques and carbonating equipment known in the art for carbonating beverages may be employed. Carbon dioxide may enhance the beverage taste and appearance and may aid in safeguarding the beverage purity by inhibiting and destroying objectionable bacteria. In certain embodiments, for example, the beverage has a $CO_2$ level up to about 4.0 volumes carbon dioxide. Typical embodiments may have, for example, from about 0.5 to 5.0 volumes of carbon dioxide. As used here and independent claims, one volume of carbon dioxide is defined as the amount of carbon dioxide absorbed by any given quantity of liquid, e.g., water, at 60° F. (16° C.) and one atmospheric pressure. A volume of gas occupies the same space as does the liquid by which it is dissolved. The carbon dioxide content may be selected by those skilled in the art based on the desired level of effervescence and the impact of the carbon dioxide on the taste or mouthfeel of the beverage. The carbonation may be natural or synthetic.

Optionally, caffeine may be added to various embodiments of the beverages disclosed here. The amount of caffeine added is determined by the desired beverage properties, any applicable regulatory provisions of the country where the beverage is to be marketed, etc. In certain exemplary embodiments caffeine is included at a level of 0.02 percent or less by weight of the beverage. The caffeine must be of purity acceptable for use in foods and beverages. The caffeine may be natural or synthetic in origin.

The beverage concentrates and beverages disclosed here may contain additional ingredients, including, generally, any of those typically found in beverage formulations. These additional ingredients, for example, may typically be added to a stabilized beverage concentrate. Examples of such additional ingredients include, but are not limited to, caffeine, caramel and other coloring agents or dyes, antifoaming agents, gums, emulsifiers, tea solids, cloud components, and mineral and non-mineral nutritional supplements. Examples of non-mineral nutritional supplement ingredients are known to those of ordinary skill in the art and include, for example, antioxidants and vitamins, including Vitamins A, D, E (tocopherol), C (ascorbic acid), B (thiamine), $B_2$ (riboflavin), $B_6$, $B_{12}$, and K, niacin, folic acid, biotin, and combinations thereof. The optional non-mineral nutritional supplements are typically present in amounts generally accepted under good manufacturing practices. Exemplary amounts are between about 1% and about 100% RDV, where such RDV are established. In certain exemplary embodiments the non-mineral nutritional supplement ingredient(s) are present in an amount of from about 5% to about 20% RDV, where established.

Preservatives may be used in at least certain embodiments of the beverages disclosed here. That is, at least certain exemplary embodiments contain an optional dissolved preservative system. Solutions with a pH below 4 and especially those below 3 typically are "microstable," i.e., they resist growth of microorganisms, and so are suitable for longer term storage prior to consumption without the need for further preservatives. However, an additional preservative system may be used if desired. If a preservative system is used, it may be added to the beverage product at any suitable time during production, e.g., in some cases prior to the addition of the sweetener. As used here, the terms "preservation system" or "preservatives" include all suitable preservatives approved for use in food and beverage compositions, including, without limitation, such known chemical preservatives as benzoates, e.g., sodium, calcium, and potassium benzoate, sorbates, e.g., sodium, calcium, and potassium sorbate, citrates, e.g., sodium citrate and potassium citrate, polyphosphates, e.g., sodium hexametaphosphate (SHMP), and mixtures thereof, and antioxidants such as ascorbic acid, EDTA, BHA, BHT, TBHQ, dehydroacetic acid, dimethyldicarbonate, ethoxyquin, heptylparaben, and combinations thereof. Preservatives may be used in amounts not exceeding mandated maximum levels under applicable laws and regulations. The level of preservative used typically is adjusted according to the planned final product pH, as well as an evaluation of the microbiological spoilage potential of the particular beverage formulation. The maximum level employed typically is about 0.05% by weight of the beverage. It will be within the ability of those skilled in the art, given the benefit of this disclosure, to select a suitable preservative or combination of preservatives for beverages according to this disclosure.

Other methods of beverage preservation suitable for at least certain exemplary embodiments of the beverage products disclosed here include, e.g., aseptic packaging and/or heat treatment or thermal processing steps, such as hot filling and tunnel pasteurization. Such steps can be used to reduce yeast, mold and microbial growth in the beverage products. For example, U.S. Pat. No. 4,830,862 to Braun et al. discloses the use of pasteurization in the production of fruit juice beverages as well as the use of suitable preservatives in carbonated beverages. U.S. Pat. No. 4,925,686 to Kastin discloses a heat-pasteurized freezable fruit juice composition which contains sodium benzoate and potassium sorbate. In general, heat treatment includes hot fill methods typically using high temperatures for a short time, e.g., about 190° F. for 10 seconds, tunnel pasteurization methods typically using lower temperatures for a longer time, e.g., about 160° F. for 10-15 minutes, and retort methods typically using, e.g., about 250° F. for 3-5 minutes at elevated pressure, i.e., at pressure above 1 atmosphere.

EXAMPLES

The following examples are specific embodiments of the present invention but are not intended to limit it.

Example 1

Beverages according to this disclosure are prepared with the following formulations. Specifically, diet colas containing natural sweeteners were formulated at three different TA levels (12, 10, and 9). At TA of 12, a common level for colas, the diet cola is tart and with bitter taste. At the lower TA level, especially at 9, diet cola having a proper sweet/tart ratio with an increased sweetness and reduced tartness was achieved. The bitterness perception was lessened.

TABLE 1

| Ingredient | Grams Formula 1 | Grams Formula 2 | Grams Formula 3 |
|---|---|---|---|
| Sodium Benzoate | 1.03 | 1.03 | 1.03 |
| Sodium citrate | 1.68 | 1.68 | 1.68 |
| Caffeine | 0.48 | 0.48 | 0.48 |
| Rebaudioside A | 3.8 | 3.8 | 3.8 |
| Erythritol | 210 | 210 | 210 |
| Tagatose | 60 | 60 | 60 |
| Phosphoric Acid 80% | 3.52 | 2.68 | 2.31 |
| Citric Acid, Anhydrous | 0.42 | 0.42 | 0.42 |
| Cola Flavor | 16.03 | 16.03 | 16.03 |
| Treated Water to | 1 Liter | 1 Liter | 1 Liter |
| Beverage property | | | |
| pH | 3.1 | 3.1 | 3.1 |
| Titratable acidity | 12.3 | 10 | 9 |
| Taste | Tart and bitter Least sweet | Sweeter, less tart And bitter | Sweetest, least tart, low bitter |

Example 2

Beverages according to this disclosure are prepared with the following formulations. In Table 2, the bitterness of Rebaudioside A is significantly reduced for the diet cola Formula 2 when the citric acid is removed from the formula 1.

TABLE 2

| Ingredient | Grams Formula 1 | Grams Formula 2 |
|---|---|---|
| Potassium citrate | 0.63 | 0.63 |
| Caffeine | 0.48 | 0.48 |
| Rebaudioside A | 3.0 | 3.0 |
| Erythritol | 210 | 210 |

TABLE 2-continued

| Ingredient | Grams Formula 1 | Grams Formula 2 |
|---|---|---|
| Phosphoric Acid 80% | 2.31 | 2.31 |
| Citric Acid, Anhydrous | 0.42 | |
| Cola Flavor | 16.03 | 16.03 |
| Treated water to Beverage Property | 1 liter | 1 liter |
| pH | 3.1 | 3.1 |
| Titratable acidity | 9 | 9 |
| Taste | | |

Example 3

Water solutions containing natural sweeteners and caffeine are prepared with the following formulations. Table 3 shows that the bitterness of Rebaudiaoside A for formula 1 is significantly reduced as shown in Formula 2 when the caffeine is removed from formula 1.

TABLE 3

| Ingredient | Grams Formula 1 | Grams Formula 2 |
|---|---|---|
| Erythritol | 210 | 210 |
| Rebaudioside A | 3.0 | 3.0 |
| Caffeine | 0.48 | — |
| Treated water to | 1 Liters | 1 Liters |
| Beverage Property | Bitter | Significantly less bitter |

Example 4

Table 4 shows that the bitterness of Rebaudiaoside A in Formula 2 is further reduced in a caffeine free flavorless cola beverage base containing single strength caramel.

TABLE 4

| Ingredient | Grams Formula 1 | Grams Formula 2 |
|---|---|---|
| Erythritol | 210 | 210 |
| Rebaudioside A | 3.0 | 3.0 |
| Potassium Citrate | 0.69 | 0.69 |
| Caffeine Anhydrous | 0.72 | |
| Phosphoric Acid 80% | 2.76 | 2.76 |
| Caramel color (single Strength) | 14.38 | 14.38 |
| Treated water to Beverage property | 1 Liters | 1 Liters |
| pH | 2.8-2.9 | 2.8-2.9 |
| TA | 9 | 9 |
| Property | Slightly bitter | Little or no bitterness |

Example 5

Reduced calorie beverages according to this disclosure are prepared with the following formulations:

TABLE 5

| Ingredient | Grams Formula 1 | Grams Formula 2 | Grams Formula 3 |
|---|---|---|---|
| Sucrose | 440 | 440 | 440 |
| Sodium Benzoate | 1.35 | 1.35 | 1.35 |
| Caffeine Anhydrous | 0.4 | 0.4 | 0.4 |
| Erythritol | 180 | 180 | 180 |
| LHG Juice | 12 | 12 | 12 |
| Phosphoric Acid 80% | 4.0 | 3.25 | 2.88 |
| Guarana | 1.25 | 1.25 | 1.25 |
| Vitamin B6 | 0.01 | 0.01 | 0.01 |
| Cola Flavor | 15.44 | 15.44 | 15.44 |
| Treated Water to Beverage property | 1 Liter | 1 Liter | 1 Liter |
| pH | 3.1 | 3.1 | 3.1 |
| Titratable acidity | 12. | 10 | 9 |
| Taste | Tart, slight bitter | Less bitter | No bitter |

Table 5 shows that the taste of reduced calorie cola beverages containing sucrose, erythritol and Lo Han Guo juice concentrate is improved at the lower TA for formula 3.

The beverages of these examples illustrate the following benefits:

1. Lower the TA from the original 12 to 9 to achieve a proper sweet/tart ratio to increase sweetness and to reduce tartness and bitterness of beverages made with natural sweeteners.

2. Removing caffeine and also citric acid from the formulas can further reduce the bitterness of rebaudiaoside A 3. Flavors and coloring (e.g. Single strength caramel) in cola formulas may also play a role in controlling the bitter taste of rebaudiaoside A Those of ordinary skill in the art will understand that, for convenience, some ingredients are described here in certain cases by reference to the original form of the ingredient in which it is used in formulating or producing the beverage product. Such original form of the ingredient may differ from the form in which the ingredient is found in the finished beverage product. Thus, for example, in certain exemplary embodiments of the beverage products according to this disclosure, sucrose and liquid sucrose would typically be substantially homogenously dissolved and dispersed in the beverage. Likewise, other ingredients identified as a solid, concentrate (e.g., juice concentrate), etc. would typically be homogenously dispersed throughout the beverage or throughout the beverage concentrate, rather than remaining in their original form. Thus, reference to the form of an ingredient of a beverage product formulation should not be taken as a limitation on the form of the ingredient in the beverage product, but rather as a convenient means of describing the ingredient as an isolated component of the product formulation.

Given the benefit of the above disclosure and description of exemplary embodiments, it will be apparent to those skilled in the art that numerous alternative and different embodiments are possible in keeping with the general principles of the invention disclosed here. Those skilled in this art will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the

What is claimed is:

1. A cola_beverage product comprising rebaudioside A, erythritol, and acidulant comprising phosphoric acid and any of citric acid, malic acid, tartaric acid, lactic acid, fumaric acid, ascorbic acid, gluconic acid, succinic acid, maleic acid, adipic acid, cinnamic acid, and glutaric acid, wherein the beverage product has a titratable acidity in the range of 8.75 to 10.5, and a pH in the range of 2.8 to 3.3.

2. The beverage product of claim 1, further comprising at least one steviol glycoside selected from the group consisting of stevioside, a steviolbioside, dulcoside A, rebaudioside B, rebaudioside C, rebaudioside D, rebaudioside E, and mixtures thereof.

3. The beverage product of claim 1, further comprising tagatose.

4. The beverage product of claim 1, where erythritol is present in the range of 1.0% to 4.5% by weight.

5. The beverage product of claim 1, wherein erythritol is present in the range of 2.5% to 3.5% by weight.

6. The beverage product of claim 1, wherein erythritol is present in the range of 2.8% to 3.5% by weight.

7. The beverage product of claim 1, wherein the acidulant comprises phosphoric acid and citric acid.

8. The beverage product of claim 1, wherein the acidulant is present in the range of 0.01% to 1.0% by weight.

9. The beverage product of claim 1, wherein the acidulant is present in the range of 0.05% to about 0.5% by weight.

10. The beverage product of claim 1, wherein the acidulant is present in the range of 0.1% to 0.25% by weight.

11. The beverage product of claim 1, having a titratable acidity in the range of 9 to 10.

12. The beverage product of claim 1, having a titratable acidity of 9.

13. The beverage product of claim 1, having a pH in the range of 3.0 to 3.2.

14. The beverage product of claim 1, wherein the beverage product is selected from the group consisting of a carbonated soft drink, a fountain beverage, and a frozen ready-to-drink beverage.

15. A beverage concentrate comprising rebaudioside A, erythritol, and acidulant comprising phosphoric acid and any of citric acid, malic acid, tartaric acid, lactic acid, fumaric acid, ascorbic acid, gluconic acid, succinic acid, maleic acid, adipic acid, cinnamic acid, and glutaric acid, wherein 1 part of the beverage concentrate when combined with 5 parts of water produces a full strength beverage having a titratable acidity in the range of 8.75 to 10.25, and a pH in the range of 2.8 to 3.3.

* * * * *